Patented Apr. 28, 1936

2,038,540

UNITED STATES PATENT OFFICE 2,038,540

EGG TREATMENT PROCESS AND PRODUCT

Faw Yap Chuck, San Francisco, Calif.

No Drawing. Application June 11, 1934,
Serial No. 730,071

5 Claims. (Cl. 99—170)

This invention relates generally to processes for the treatment of eggs to effect their preservation, and to products of manufacture resulting from such processes.

In the past it has been common in the poultry industry to process eggs by coating them with a film of mineral oil, as by dipping or spraying the eggs with oil at an elevated temperature. Processes of this character have been found of material assistance in minimizing spoilage of eggs in storage or in transit. However, the preservative effect of such treatment is not all that may be desired, and certain inherent disadvantages are encountered which, prior to my invention, have not been overcome. One of the chief disadvantages is that eggs processed with ordinary oil have a glossy, unnatural appearance, thus making it necessary to remove the oil, as by sand blasting, before the eggs are sold to the public. Aside from the cost which such additional treatment involves, sand blasting frequently leaves the shell extremely weak or friable, and deterioration after such treatment proceeds at a rapid rate. A further disadvantage is that eggs requiring a preliminary cleaning cannot be properly processed with oil and must therefore be sold as seconds. This obviously causes a considerable loss to the poultry industry, since eggs thus sold as seconds may be in good condition except for dirt or other foreign matter requiring removal.

It is an object of the present invention to provide a process for the treatment of eggs, which not only will effect better preservation than processes used in the past, but also will obviate the difficulties outlined above. The present process is characterized by the fact that the treated eggs assume an attractive chalky white appearance, thus obviating further treatment after storage or transit, and by the fact that it can be applied to washed or sand-blasted eggs as well as to eggs which require no preliminary cleaning.

A further object of the invention is to provide a new and novel article of manufacture, resulting from treatment of eggs in accordance with my process.

Further objects of the invention will appear from the following description, in which the preferred embodiments of the invention have been set forth in detail.

The shell of an egg consists largely of calcium carbonate, a typical analysis being as follows:

| | Percent |
|---|---|
| $CaCO_3$ | 96.63 |
| $Ca_3PO_4$ | 0.79 |
| $MgCO_3$ | 0.84 |
| Keratin | 1.54 |

The structure of the shell is such as to afford pores through which gas may pass. The keeping period of an egg before spoilage is dependent upon several factors, including temperature and the condition of the surrounding atmosphere. As eggs are stored there is a gradual loss of weight, due largely to evaporation of moisture through the shell, and at the same time the thick white (that part of the egg white immediately surrounding the yolk) thins out and the yolk tends to become flabby. Metabolism during storage is also characterized by evolution of carbon-dioxide gas which escapes through the pores of the shell. Due to the loss of carbon-dioxide the proteolysis of the thick white is accelerated.

I have found that it is possible to effectively preserve eggs by forming a supplemental deposit of insoluble alkaline earth carbonate upon the shell. I have particular reference to carbonates of alkaline earth metals such as constitute a part of the natural shell, namely, calcium carbonate, magnesium carbonate, or both. The formation of such a deposit directly upon the shell imparts an attractive chalky appearance, and at the same time reduces porosity. I have also found that the substance or substances utilized to secure such deposits can be applied together with a mineral oil, as a liquid emulsion, and that the small amount of mineral oil so applied will not impart a glossy appearance.

In practicing my invention, I make up an emulsion of mineral oil, together with a suitable alkaline earth salt or base. For example, I have employed (1) calcium stearate together with mineral oil, (2) calcium lactate and mineral oil, (3) calcium hydroxide and mineral oil, (4) calcium chloride and mineral oil, (5) calcium lactate, calcium hydroxide and mineral oil, and (6) calcium hydroxide, magnesium hydroxide and mineral oil. A suitable mineral oil is the so-called "white oil" which is commonly used of itself in the processing of eggs.

In making up the coating liquids referred to in the above examples, care must be taken to effect proper emulsification of the mineral oil, and frequently the use of an added emulsifying agent is required. In the first example, the mineral oil is first mixed with stearic acid, and then a saturated solution of lime in water is added. The final emulsion may contain, say, 60% oil and 40% saturated lime solution, by weight. In the second example, a suitable soap as an emulsifying agent is added to calcium lactate together with a suitable amount of water, and then the mineral oil is added with sufficient agitation to effect proper emulsification. In the third example, unslaked lime is first mixed with a mineral oil, and then water is added while the mixture is being agitated. Examples (4), (5), and (6) can be similarly prepared, an emulsifying agent being employed if necessary, to produce a comparatively stable emulsion.

Assuming that the second liquid material referred to above is being employed, namely, an emulsion of calcium lactate and mineral oil, this emulsion is applied to the surface of the egg, as by dipping or spraying. A thin film of the material will remain upon the surface of the egg, and a certain amount of penetration through the shell pores will occur. A period of conversion now takes place, during which the calcium of the coating material is converted to calcium carbonate, by combining with carbon-dioxide of the surrounding atmosphere and carbon-dioxide being evolved from the interior of the egg by metabolism. Reaction with carbon-dioxide being evolved from the interior of the egg appears to be particularly effective in securing the desired results, because it ensures a proper bonding of the calcium carbonate to the shell of the egg, particularly in the region of the shell pores. After the period of conversion, which will be completed in about twenty-four hours, the egg assumes a chalky white appearance, and the presence of a small amount of mineral oil is not visibly apparent.

Tests which I have conducted convincingly demonstrate the utility of my process in preserving eggs. With eggs processed by emulsions as specified above, and under given atmospheric conditions, loss of weight proceeded at a relatively slow rate; in fact, in actual tests the loss of weight over a given time period was about one-half as much as the loss of weight experienced with eggs processed with mineral oil alone, in accordance with prior practice, and about one-third as much as unprocessed eggs. In keeping with the relatively lower loss of weight, the eggs were kept fresh for a longer period of time, as was evident from a lesser degree of thinning out of the thick white and a firmer condition of the yolk. A deposit of calcium-carbonate or like material will remain intact, since it is formed substantially as a part of the natural shell and because it is substantially water-insoluble.

While the use of an emulsion such as calcium hydroxide with mineral oil is effective in minimizing loss of weight and in effecting preservation, the use of a mild organic acid, such as lactic acid, in conjunction with the emulsion, is deemed desirable. Such an ingredient is a sterilizer and disinfectant which remains effective upon the surface of the egg for a relatively long period of time. Thus the possibility of contamination by external moisture is materially minimized.

The use of a mineral oil together with the coating material is desirable in that the relatively thin application thus afforded upon the surface of the egg tends to inhibit moisture, and thus minimizes the passage of external moisture to the interior of the egg with resultant possible contamination and infection. Likewise, the oil appears to serve in part, together with the carbonate deposit, to more effectively minimize shell porosity.

Due to the fact that eggs processed in accordance with my invention are not glossy, but are chalky white in appearance, no further processing or sand blasting is required after storage and before the eggs are sold to the public. Likewise, due to the nature of my coating material, which actually tends to build up the natural alkaline earth carbonate of the shell, the invention is applicable to eggs which have been cleaned, by washing or sand blasting, before processing. In fact, the coating materials which I have specified by way of examples have a natural cleaning effect, and, if desired, this cleaning effect can be utilized to advantage to effect cleaning or washing of the eggs simultaneously with processing.

In explanation of the scope of the appended claims, it may be noted that I have processed eggs by the use of a simple solution, such as a saturated solution of calcium hydroxide, without utilizing mineral oil. However, the use of a mineral oil is deemed desirable, particularly since it affords a moisture-inhibiting medium upon the surface of the eggs, as previously explained. Applying the oil in the form of an emulsion avoids an excessive application and obviates the use of an elevated temperature for the coating medium.

I claim:

1. In a process for the preservation of eggs, applying a liquid coating material to the exterior of the egg, the coating material consisting of an emulsion of oil and water together with a substance readily convertible by carbon-dioxide to form a substantial alkaline earth carbonate deposit on the egg shell.

2. In a process for the preservation of eggs, applying a liquid coating material to the exterior of the egg, the coating material consisting of an emulsion of oil and water together with a water-soluble alkaline earth compound capable of ready conversion by carbon-dioxide to form a substantially insoluble alkaline earth carbonate.

3. In a process for the preservation of eggs, applying a liquid coating material to the exterior of the egg, the coating material consisting of an emulsion of a mineral oil and water together with a soluble alkaline earth compound and an emulsifying agent, the alkaline earth compound being capable of ready conversion by carbon-dioxide to form a substantially insoluble alkaline earth carbonate.

4. As a new article of manufacture, an egg having a supplemental deposit of alkaline earth carbonate integrally bonded to its natural shell and serving to reduce the natural porosity of the shell, together with a relatively thin coating of mineral oil, the exterior surface of the egg having a chalky white appearance.

5. As a new article of manufacture, an egg having a supplemental deposit of calcium carbonate integrally bonded to its shell and serving to reduce the natural porosity of the shell, together with a mild organic acid and a light film of mineral oil.

FAW YAP CHUCK.